Figure 1:
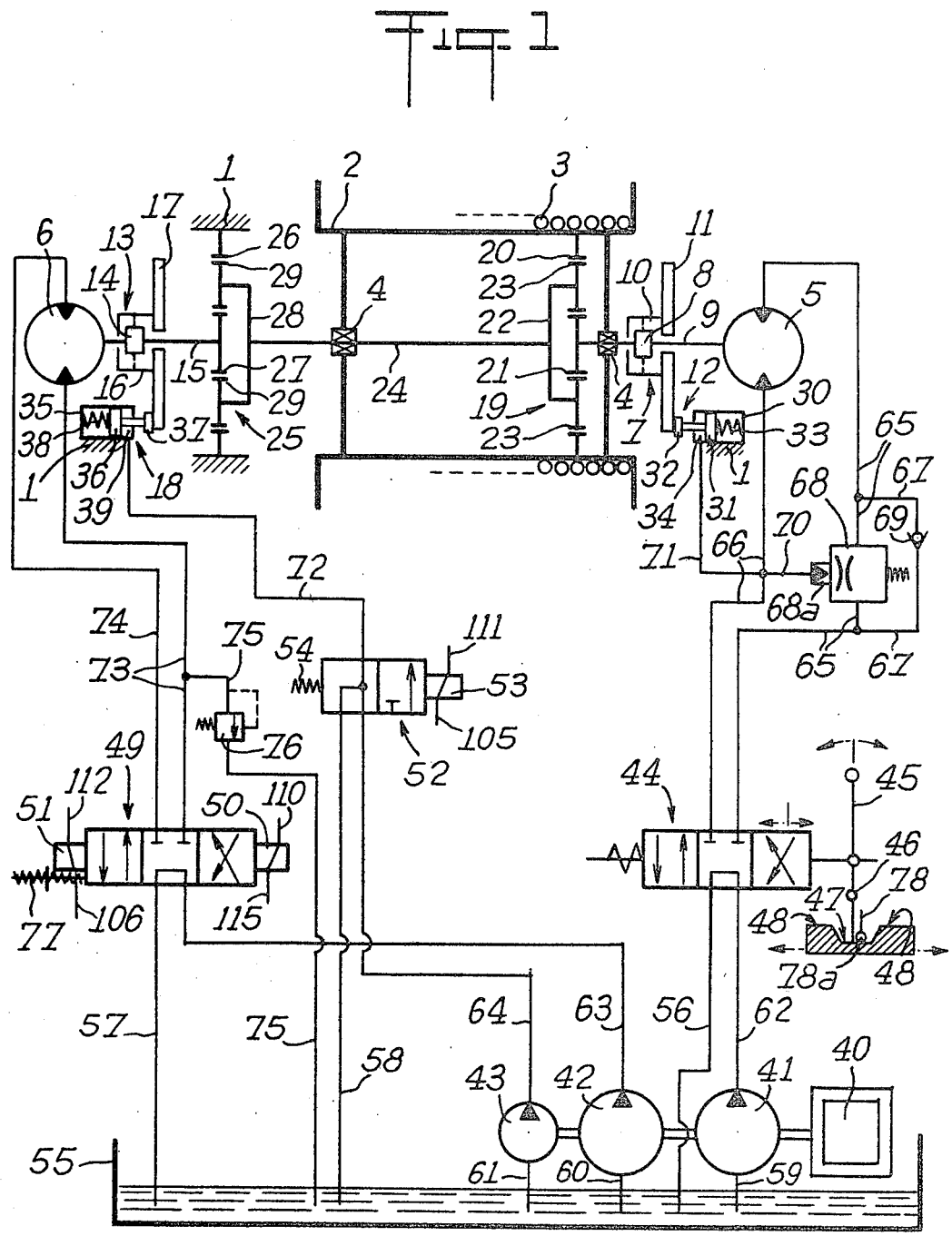

United States Patent [19]

Charles

[11] 4,434,972

[45] Mar. 6, 1984

[54] HOISTING WINCH

[75] Inventor: Georges M. Charles, Saint Vallier, France

[73] Assignee: Potain Poclain Materiel (P.P.M.), France

[21] Appl. No.: 309,111

[22] Filed: Oct. 6, 1981

[30] Foreign Application Priority Data

Oct. 8, 1980 [FR] France ............................ 80 21502

[51] Int. Cl.³ .................. B66D 1/08; B66D 1/22; B66D 1/44

[52] U.S. Cl. ................................ 254/340; 74/675; 74/784; 254/344; 254/361; 414/139

[58] Field of Search .............. 254/340, 339, 344, 356, 254/357, 361, 375, 376, 293; 74/675, 784; 414/139, 138, 137

[56] References Cited

U.S. PATENT DOCUMENTS 2,178,305 10/1939 Smaltz .
3,850,411 11/1974 Fedoronich et al. .............. 254/344
4,132,387 1/1979 Somerville et al. ................. 254/356

FOREIGN PATENT DOCUMENTS 671584  2/1939 Fed. Rep. of Germany .
690743  4/1940 Fed. Rep. of Germany .
2534045 2/1976 Fed. Rep. of Germany .
2709089 9/1977 Fed. Rep. of Germany .
776228 10/1934 France .
1213722 1/1959 France .
138762 11/1979 German Democratic Rep. .................................... 254/340
140027 6/1980 German Democratic Rep. .................................... 254/340
508067 6/1939 United Kingdom .
1269777 4/1972 United Kingdom .

Primary Examiner—Billy S. Taylor
Attorney, Agent, or Firm—Lewis H. Eslinger

[57] ABSTRACT

The present invention is a hoisting winch that uses two motors, one a low-speed, high-torque hoisting motor and the other a high-speed, low-torque compensation motor. The motor shafts are connected to a cable drum by an epicycloidal gear trains. Uni-directional freewheel assemblies are operatively connected to the motor shafts between the motors and an associated gear train. A first free wheel assembly includes a first driving element which is connected to the hoisting motor shaft and which drives a first driven element only in the drum unwinding direction. A second free wheel assembly includes a second driving element which is connected to the compensation motor shaft and which drives a second driven element driven only in the drum winding direction. Selectively appliable and releasable brakes resist rotation of the driven elements. An electrohydraulic control system controls the motors and brakes to allow the hoisting winch to be used in loading and unloading cargo from a ship.

2 Claims, 4 Drawing Figures

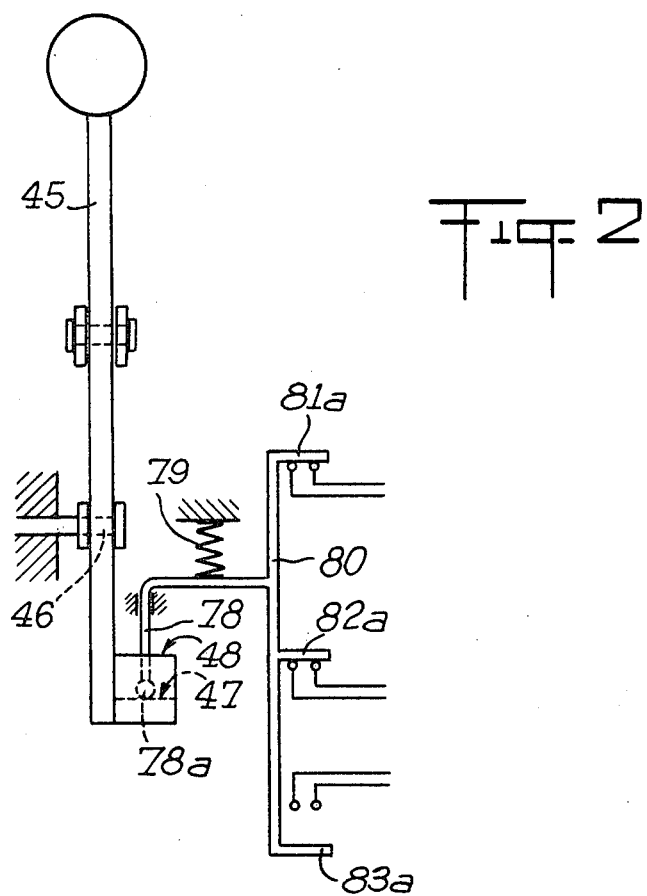
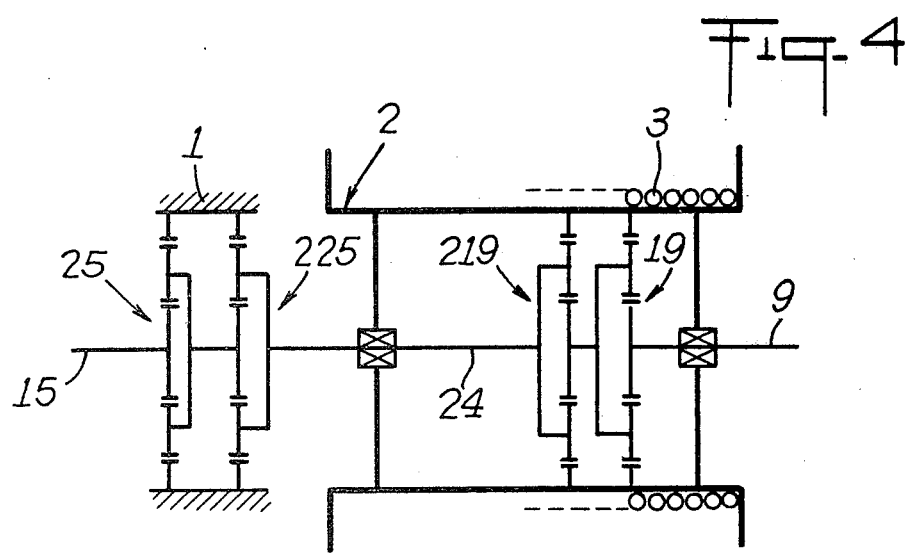

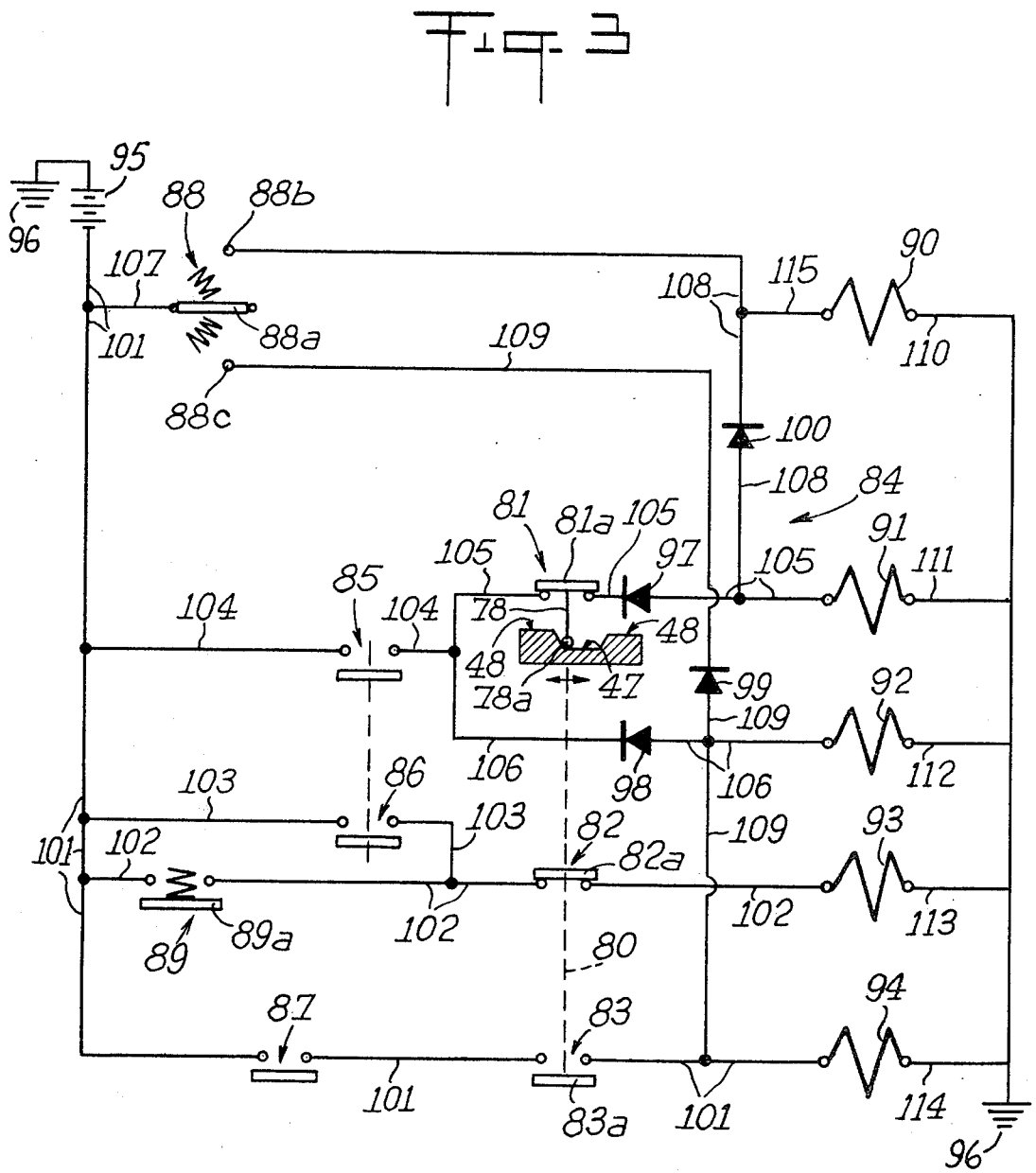

HOISTING WINCH

The invention relates to a hoisting winch.

A number of problems arise when unloading cargo from a ship by a crane mounted on a fixed structure. They are particularly noticeable when a ship is unloaded at sea by a crane mounted on an oil rig.

What happens is that the ship may have a relative movement of great amplitude with respect to the fixed structure, due to the swell. To unload, the crane hook needs to be suspended to the goods, and to do this the hoisting cable must be slackened off. Then it is necessary to straighten or take up slack the cable and to lift the load very rapidly in order to suspend it out of the reach of the deck-hands, otherwise there could be serious risks of accidents. This would be the case for example if, the cargo being already off the ship's deck, the latter was very suddenly being lifted up by a wave. In the same way, if the cable is not slack enough and the ship on the contrary sinks into a trough the load risks to be suspended prematurely and to be equally dangerous for people underneath.

The solution found up-to-now consists in providing a powerful and instant hoisting winch, which entails the adoption of winch-driving motors which are excessively expensive and unnecessarily so since, once the suspended load has reached a safe area of manoeuvering, its hoisting speed can be low without this raising any problems which implies that the motor driving the winch can be relatively slow. This prior solution is not therefore satisfactory on this particular point and, what is more, it is technologically defective.

It is the object of the invention to overcome these drawbacks by proposing a winch which is driven in rotation by two jointly-acting motors, one motor at a first relatively slow speed, whilst creating a high drive torque, the other motor, at a second speed much higher than the first (three times higher for example), with a low drive torque, just enough to straighten or take up slack the hoisting cable, but not enough to hoist the load. With this arrangement, it is possible not only to lift the load in the conventional way but also to "compensate" the movements of the ship by automatic and instant straightening of the cable. These two motors are of course smaller than the signle motor used in the prior solution, and so they are less expensive.

The invention will be more readily understood on reading the following description with reference to the accompanying drawings, in which:

FIG. 1 diagrammatically shows a first embodiment of the winch according to the invention;

FIG. 2 shows a detail of the first embodiment shown in FIG. 1;

FIG. 3 constitutes a diagram of the logic control device controlling the winch of FIG. 1; and, FIG. 4 shows a detail of a second embodiment of a winch according to the invention.

FIG. 1 shows a first variant of embodiment of a winch consisting of:

a winch chassis 1, a drum 2 on which is wound a cable 3, mounted for rotation with respect to the chassis 1 by means of bearings 4, a hydraulic motor 5 with high torque and large cubic capacity, a fast hydraulic motor 6 with a cubic capacity several times smaller than that of the motor 5, a first free wheel 7, of which a first element 8 is fast in rotation with the output shaft 9 of the motor 5, and of which the second element 10 is fast with the disk 11 of a first brake 12, said first free wheel being mounted so as to lock its two elements 8 and 10 in rotation in the direction of rotation of the drum which corresponds to the unwinding of the cable, and complementarily to unlocking said elements in the reverse direction of rotation, a second free wheel 13, of which a first element 14 is fast in rotation with the output shaft 15 of the motor 6 and of which the second element 16 is integral with the disk 17 of a second brake 18, said second free wheel being mounted so as to lock its elements 14 and 16 in rotation in the direction of rotation of the drum which corresponds to the winding of the cable, and, complementarily, to unlock said elements in the reverse direction of rotation, a first epicycloidal gear train 19 comprising a rim 20 integral with the drum 2, a sun gear 21 fast with the output shaft 9 of the motor 5, and a planet carrier 22 supporting the planet wheels 23 and being fast with a shaft 24, a second epicycloidal gear train 25 comprising a rim 26 integral with the chassis 1, a sun gear 27 fast with the output shaft 15 of the motor 6, and a planet carrier 28, which supports the planet wheels 29 and is fast with the shaft 24, the cylinder 30 of the first brake 12, which is secured on the chassis 1 and in which slides a piston 31 to which is coupled the friction lining 32, a spring 33 returning said friction lining in contact on the disk 11 and having an effect which opposes the pressure of the fluid contained in the chamber 34 of the cylinder 30, the cylinder 35 of the second brake 18, which is fitted on the chassis 1 and in which slides a piston 36 to which is coupled the friction lining 37, a spring 38 returning the said lining in resting contact on the disk 17 and having an effect which opposes that of the pressure of a fluid contained in the chamber 39 of the cylinder 35, a motor 40 driving three hydraulic pumps 41, 42, 43, a first three-position control valve 44, provided with a position adjusting lever 45, pivoting about an axis 46 and integral with a cam provided with a hollow portion 47 framed by two raised portions 48, a second three-position control valve 49, provided with two electromagnets 50 and 51, capable when they are excited, to place the control valve in one or the other of its end positions, a two-position control valve 52, which is also provided with an electromagnet 53 which is capable of bringing said control valve in one of its positions when it is excited, with an antagonistic effect to that of a return spring 54, a hydraulic fluid tank 55.

The hydraulic control circuit is composed of the following pipes:

pipes 56, 57, 58 respectively connecting the control valves 44, 49 and 52 to the tank 55, induction pipes 59, 60, 61 respectively connecting the pumps 41, 42, 43 to the tank 55, delivery pipes 62, 63, 64 respectively connecting the pumps 41, 42, 43 to the control valves 44, 49, 52, pipes 65 and 66 connecting the control valve 44 to the main connectors of the motor 5, corresponding to the rotations of the drum causing the winding and the unwinding of the cable 3, respectively, a "by-pass" pipe 67, shunt-connected to the pipe 65, on either sides of a controlled flow-regulating valve and on which a non-return valve 69 is fitted so as to bar the fluid flow in that pipe 67, from the motor 5 towards the control valve 44, a controlling pipe 70 connecting the pipe 66 to the controlling connector 68a of the flow-regulating valve 68, a pipe 71 connecting the chamber 34 to the pipe 66, a pipe 72 connecting the chamber 39 to the control valve 52, pipes 73 and 74 connecting the main connectors of the motor 6 to the control valve 49, and corresponding to the rotations of the drum causing the winding and unwinding of the cable, respectively, a pipe 75 which is shunt-connected on the pipe 73 and connecting said pipe 73 to the tank 55, a calibrated discharge valve 76 being fitted on said pipe 75 (relatively low calibration of around 30 to 50 bars: whereas the pump 41 delivers for example between 300 and 350 bars maximum).

A spring 77 is coupled to the fluid control valve 49 and tends to return it to a middle position. In addition, a lever 78 is mounted for sliding vertically, and has its ends 78a held in resting contact on the cam 47-48 by a spring 79. A support 80 is integral with the lever 78. On said support 80 are fixed mobile contacts 81a, 82a and 83a of contactors 81, 82 and 83.

There is indeed a device 84 for the logic control of the different elements of the hydraulic circuit. This logic device 84 is of the electrical type and comprises:
the contactors 81, 82 and 83,
three other contactors 85, 86 and 87,
two "astable" switches 88 and 89, with self-actuation 88a and 89a,
five relays 90, 91, 92, 93 and 94, the relays 90, 91 and 92 being those of electromagnets 50, 51 and 53 respectively,
a source of electrical power 95,
an earth 96,
four diodes 97, 98, 99 and 100, and
the electrical leads connecting these constituents.

Referring now to FIG. 3, this shows the device 84 using the conventional methods, but the following points will be noted: an electrical wire 101 connects up the source 95 to one terminal of the relay 94, the contactors 87 and 83 being placed on said wire 101. A wire 102 connects up the wire 101, to which it is connected between the source and the contactor 87, to a terminal of the relay 93, the astable switch 89 and the contactor 82 being disposed on said wire 102. A wire 103, on which is placed the contactor 86, is connected up to the wire 101 between the source 95 and the contactor 87 and connects said wire 101 to the wire 102 to which it is connected between the switch 89 and the contactor 82. A wire 104 is connected up to the wire 101 between the source 95 and the contactor 87, and, to two other wires 105 and 106 which are in turn connected up to a terminal of the relays 91, 92 respectively. The contactor 85 is placed on the wire 104, whereas the diode 97 and the contactor 81 are placed on the wire 105, and the diode 98 is placed on the wire 106. The astable switch 88 has two control positions, and therefore three terminals which are connected, a first terminal to the wire 101, between the source 95 and the contactor 87, via a wire 107; the second terminal 88b to the wire 105, between the relay 91 and the diode 97, via a wire 108, on which is placed the diode 100, and the third terminal 88c to the wire 106 between the relay 92 and the diode 98, and to the wire 101 between the relay 94 and the contactor 83, via a wire 109. Wires 110, 111, 112, 113 and 114 connect the other terminals of the relays 90, 91, 92 and 93 respectively to the earth 96. A wire 115 connects a terminal of the relay 90 to the wire 108, between the terminal 88b and the diode 100.

The three positions of the control valve 44 correspond:
the first position, to creating a communication between the pipes 62 and 65 and the pipes 66 and 56, to placing the end 78a on one of the projecting portions 48 of the cam, to closing off the contactor 83 and to opening the contactors 81 and 82;
the second position to creating a communication between the pipes 62 and 56, to closing off the pipes 65 and 66, to bringing the end 78a in resting contact in the hollow portion 47 of the cam, when the contactor 83 is opened (FIG. 3) and the contactors 81 and 82 are closed; and,
the third position, to creating a communication between the pipes 62 and 66 and the pipes 65 and 56, to bringing the end 78a in resting contact on the other projecting portion 48 of the cam, to closing off the contactor 83 and to opening the contactors 81 and 82.

The three positions of the control valve 49 correspond:
the first position, to creating communications between the pipes 63 and 73, and the pipes 74 and 57 and to energizing the electromagnet 51 through the self-actuation of the astable switch 89, and through the control valve 44 being placed in its first or in its third position (the contactor 89 being closed);
the second position, to creating a communication between the pipes 63 and 57, to closing off the pipes 73 and 74 and to the two electromagnets 50 and 51 not being excited; and
the third position, to creating communications between the pipes 63 and 74, and the pipes 73 and 57 and to exciting the electromagnet 50 through the self actuation of the switch 89, and through the control valve 44 being placed in its first or in its third position.

The two positions of the control valve 52 correspond:
the first position to creating a communication between the pipes 72, 58 and 64; and
the second position to creating a communication between the pipes 64 and 72 and to closing off the pipe 58, and to exciting the electromagnet 53.

The different phases of operation made possible by the device described hereinabove are briefly recalled in the following table.

| Phase of operation | Position of Reference Control Valve | | | Fluid supply to reference conduit | | | | Reference Brake on | | Rotation speed V and maximum tensile strength of Drum 2 | |
|---|---|---|---|---|---|---|---|---|---|---|---|
| | 44 | 49 | 52 | 65 | 66 | 73 | 74 | 12 | 18 | V | F ($10^4$ Newtons) |
| Stop | 2 | 2 | 1 | 0 | 0 | 0 | 0 | yes | yes | 0 | 0 |
| Main Lifting up | 1 | 2 | 1 | yes | 0 | 0 | 0 | yes | yes | Vo | 3 |
| Compensation | 2 | 1 | 2 | 0 | 0 | yes | 0 | yes | no | 2.8 Vo | 0.3 |
| Lifting up +Compensation | 1 | 1 | 1 | yes | 0 | yes | 0 | yes | yes | Vo or 2.8 Vo | 3 at V ≦ Vo 0.3 at V > Vo |
| Main lowering | 3 | 2 | 1 | 0 | yes | 0 | 0 | no | yes | Vo | 3 to 5 |
| Instant lifting with no load | 2 | 1 | 1 | 0 | 0 | yes | 0 | yes | yes | 2.8 Vo | 0.3 |
| Rapid lowering with no load | 2 | 3 | 2 | 0 | 0 | 0 | yes | yes | no | 2.8 Vo | 0.3 |

The presence of the free wheels 7 and 13 and the action of the brakes 12 and 18 make these different phases possible as theory as well as a test of the real functioning have proved.

It is interesting to observe more particularly the following points:

the main rising or lowering movements are controlled by the motor 5 only, as is the case with all the priorly known winches;

the compensation is obtained by switching on the motor 6 which can only create a low driving torque of the drum 2;

when the motor 5, which has a strong driving torque and the motor 6 which has a low torque work both in the load-lifting direction, the drum 2 is driven either by one or by the other of these two motors, the choice of the motor being an automatic one depending on the winding speed; for example, when the swell lifts up the ship and then the winding speed V becomes greater than Vo, which is the speed of rotation of the drum corresponding to the maximum speed of rotation of the motor 5, it is the motor 6 which drives the drum at high speed which can reach 2.8 Vo in the cited example, but with a low torque (and a low force F), whereas on the contrary, when the load is off the ship and suspended on the cable 3, it is the motor 5 which drives the drum at a speed at least equal to Vo but with a high torque (or a great force F);

to obtain the combined lifting and compensation operation it is obviously necessary for the drum 2 to be driven by one or the other motor 5 or 6, hence the necessity of having at least one epicycloidal gear train 19;

it is also to be noted that having positioned the two motors 5 and 6, the epicycloidal train 19 and the aforesaid free wheels and brakes, it is possible to lower or raise instantly the load suspension hook solely by adding to the control logic, the astable switch 88 with two active positions: one position connecting the wires 107 and 108 (terminal 88b) this controlling the instant lowering, and the other position connecting the wires 107 and 109, this controlling the instant lifting. These possibilities of obtaining instant lifting or lowering, with no load, by the motor 6 are advantageous, as they permit to save operating time; they also only necessitate the addition of a switch 88 and of diodes 99 and 100, all the other elements being already necessary for the motors 5 and 6 to lift in combination.

The invention is not limited to the description given hereinabove but on the contrary covers any variants that can be brought thereto without departing from its scope or its spirit.

For example, the "mechanical" transmissions between the motors 5 and 6 and the drum 2 could require more than two epicycloidal gear trains, for example four gear trains 19, 26, 29 and 25, as shown in FIG. 4.

It should also be noted that the hydraulic motors 5 and 6 could be replaced by electrical motors.

In addition, the logic circuit of FIG. 3 is in itself quite conventional, even though it enables to obtain advantageous logic combinations of the functions described hereinabove.

What is claimed is:

1. A hoisting winch comprising:
a drum mounted for rotation in two directions on a drum shaft for winding and unwinding a flexible cable on said drum;
a high-torque, low-speed hoisting motor having a hoisting shaft rotatable by said hoisting motor in two directions for rotating said drum in said winding and said unwinding directions;
a low-torque, high-speed compensation motor having a compensation shaft rotatable by said compensation motor in two directions for rotating said drum in said winding and said unwinding directions;
an epicycloidal gear train including a ring gear mounted to said drum in driving relation therewith, at least one planet gear on a planet carrier mounted in driving relation to said compensation shaft and a sun gear mounted in driving relation to said hoisting shaft;
first uni-directional free wheel means mounted to said hoisting shaft between said gear train and said hoisting motor and including a first driving element mounted in driving relation to said hoisting shaft and a first driven element for driving by said first driving element only in the direction of rotation corresponding to the unwinding direction of rotation of said drum;

first brake means selectively appliable for resisting rotation of said first driven element by said first driving element;

second uni-directional free wheel means mounted to said compensation shaft between said gear train and said compensation motor and including a second driving element mounted in driving relation to said compensation shaft and a second driven element for driving by said second driving element only in the direction of rotation corresponding to the winding direction of rotation of said drum; and second brake means selectively appliable for resisting rotation of said second driven element by said second driving element.

2. A hoisting winch as in claim 1; further comprising a control system including:

means for actuating said hoisting motor to rotate said hoisting shaft in the drum-winding direction, de-actuating said compensation motor and applying said first and second brake means;

means for actuating said compensation motor to rotate said compensation shaft in the drum-winding direction, de-actuating said hoisting motor, applying said first brake means and releasing said second brake means;

means for actuating said hoisting and compensation motors to rotate said hoisting and compensation shaft in the drum-winding direction and applying said first and second brake means; and means for actuating said hoisting motor to rotate said hoisting shaft in the drum-unwinding direction, de-actuating said compensation motor, releasing said first brake means and applying said second brake means.

* * * * *